United States Patent
Nakamura

(10) Patent No.: US 6,269,429 B1
(45) Date of Patent: *Jul. 31, 2001

(54) MICROCOMPUTER WHICH WRITER DATA TO MEMORY BASED ON AN INTERRUPT CONTROL MODE

(75) Inventor: Takanori Nakamura, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,611

(22) Filed: Oct. 20, 1997

(30) Foreign Application Priority Data

Oct. 25, 1996 (JP) .................................. 8-283644

(51) Int. Cl.[7] ...................................... G06F 12/02
(52) U.S. Cl. ............................................. 711/154
(58) Field of Search .................... 711/103, 154; 710/260, 266

(56) References Cited

U.S. PATENT DOCUMENTS

| | | | |
|---|---|---|---|
| 4,406,429 | * | 9/1983 | Allen ................................ 244/3.11 |
| 5,784,712 | * | 7/1998 | Byers et al. ........................ 711/219 |
| 5,881,295 | * | 3/1999 | Iwata ................................ 711/103 |

FOREIGN PATENT DOCUMENTS

| | | |
|---|---|---|
| 5-266219 | 10/1993 | (JP) . |
| 6-111032 | 4/1994 | (JP) . |

* cited by examiner

*Primary Examiner*—Kevin L. Ellis
(74) *Attorney, Agent, or Firm*—McGuireWoods LLP

(57) ABSTRACT

A microcomputer includes a central processing unit, an interrupt request generation unit for generating an interrupt processing request, a processing request control unit for controlling two processing requests in response to the interrupt processing request on the basis of a first interrupt mode for performing interrupt processing using a program stored in a program memory and a second interrupt mode for performing interrupt processing without using the program stored in the program memory, and a flash memory serving as an electrically programmable erasable read-only memory. Processing of writing/deleting data in/from the flash memory is performed in the second interrupt mode.

3 Claims, 13 Drawing Sheets

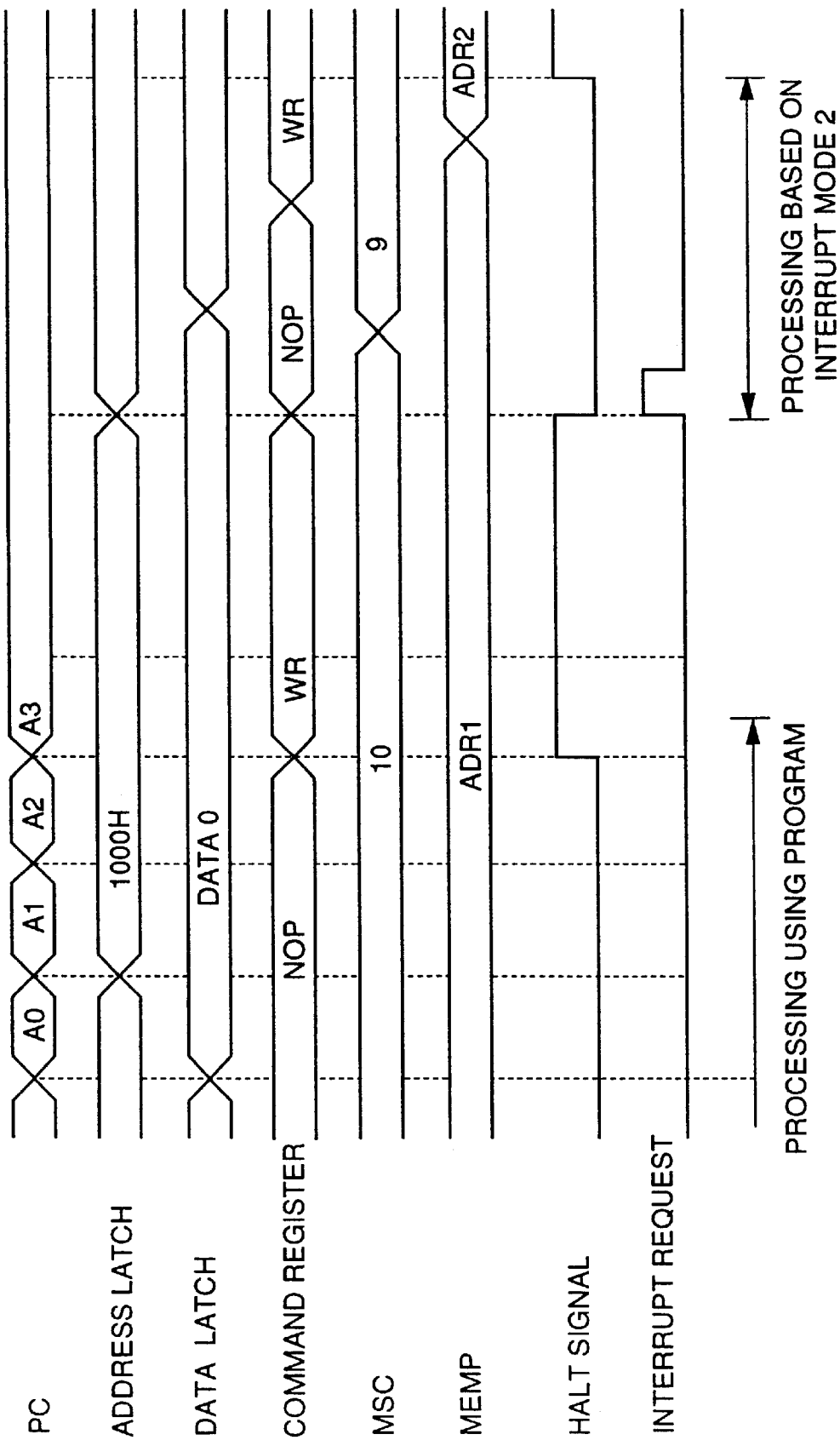

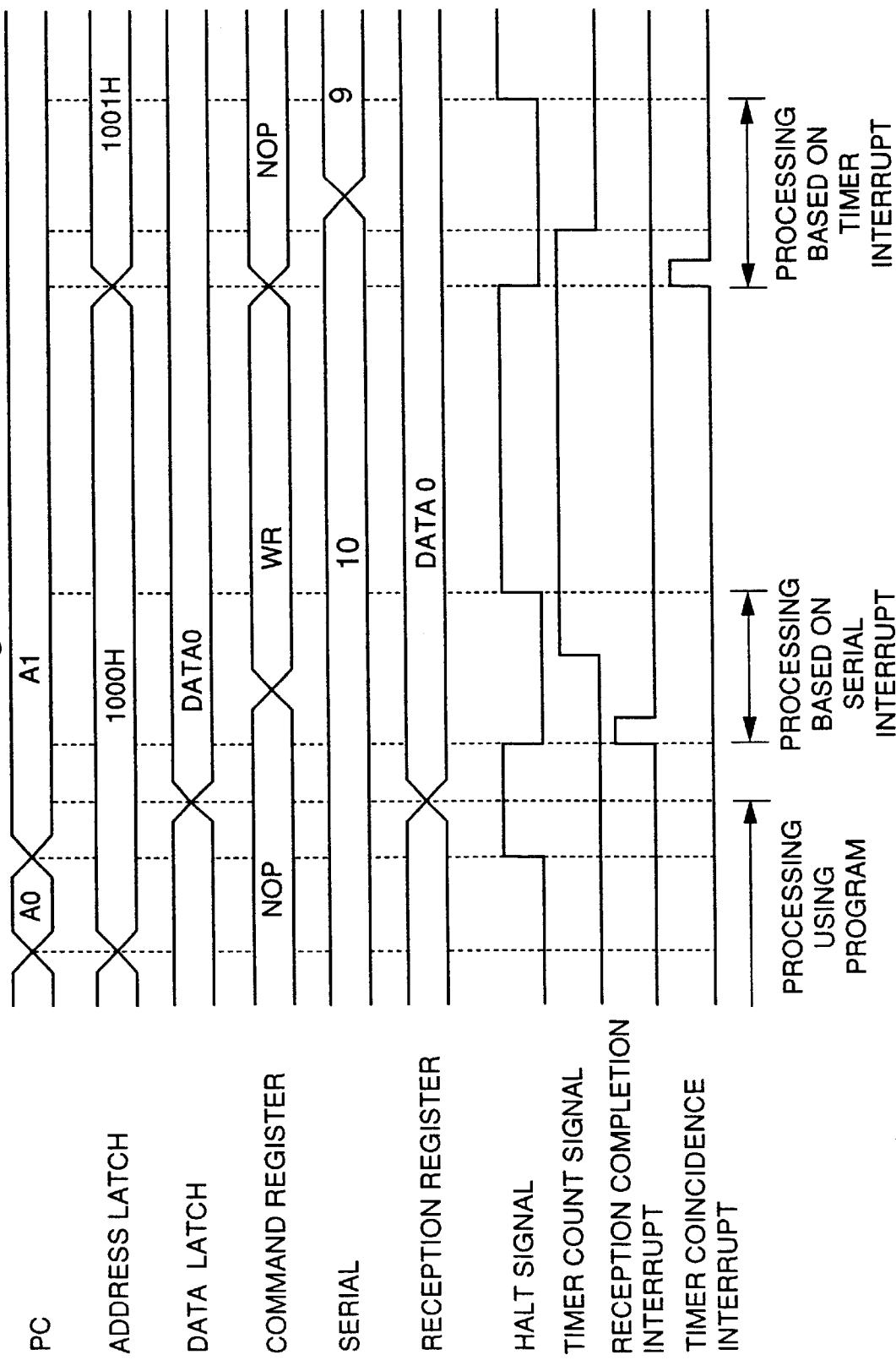

MICROCOMPUTER WHICH WRITER DATA TO MEMORY BASED ON AN INTERRUPT CONTROL MODE

BACKGROUND OF THE INVENTION

1. Field of the Invention

The present invention relates to a microcomputer incorporating an electrically erasable programmable flash memory.

2. Description of the Prior Art

The first prior art of a microcomputer which can write/ erasure data in/from a flash memory is disclosed in Japanese Unexamined Patent Publication No. 5-266219. In this prior art, a microcomputer having the first mode for controlling the flash PROM using a CPU and the second mode for controlling the flash PROM using a circuit outside the semiconductor circuit is described. FIG. 1 is a block diagram of such a conventional microcomputer incorporating a flash memory and allowing write and erase processing. The microcomputer comprises a central processing unit 1, a flash PROM 2, a register 3, a RAM 4, an interrupt request generation unit 5, a timer unit 6, an internal bus 7, and a ROM 8.

The central processing unit (to be referred to as a CPU hereinafter) 1 comprises a program counter (to be referred to as a PC hereinafter) 11 for writing data transferred via the internal bus 7 and outputting an address signal ADR to the flash PROM 2, an instruction register 12 for latching an instruction code transferred via the internal bus 7, an instruction decoder 13 for decoding the instruction code from the output from the instruction register 12, an execution control unit 14 for executing the instruction in accordance with the decoded result from the instruction decoder 13, an ALU 15 for loading, e.g., two data transferred via the internal bus 7, performing calculation in accordance with the execution control unit 14, outputting the calculation result to the internal bus 7, and outputting the flag change according to the calculation result to a program status word (to be referred to as PSW hereinafter) register 16 constituted as a register, and an interrupt request reception unit 17 for controlling interrupt processing in accordance with an interrupt request signal IRQ output from the interrupt request generation unit 5.

The flash PROM 2 comprises a flash memory (memory cell) 21, a write/erase/read control circuit (to be referred to as a WER circuit hereinafter) 22, a data latch 23 for latching, from the internal bus 7, data to be written in the flash memory 21, a command register 24 for latching, from the internal bus 7, a command to be supplied to the WER circuit 22, an address latch 25 for latching, from the internal bus 7, an address to be used in the write mode to the flash memory 21, and a selector 26 for switching the address signal ADR and the output signal from the address latch 25 and outputting the selected signal to the flash memory 21 as an address. When the command register 24 is in an NOP mode representing processing other than write/erase processing, i.e., normal read processing, the selector 26 outputs the address signal ADR to the flash memory 21 as an address. When the command register 24 is not in the NOP mode, the selector 26 outputs the output signal from the address latch 25 to the flash memory 21 as an address.

The RAM 4 receives an address from the internal bus 7 and receives/outputs data from/to the internal bus 7. The timer unit 6 is constituted by a timer for performing a count operation in synchronism with an internal clock, and a compare register. When the value of the timer coincides with that of the compare register, the timer unit 6 outputs an interrupt signal to the interrupt request generation unit 5 and clears the timer. The interrupt request generation unit 5 receives an interrupt request from a peripheral circuit such as the timer unit 6 and outputs the interrupt request signal IRQ to the interrupt request reception unit 17 of the CPU 1. The ROM 8 stores a program for writing data in the flash PROM 2 and is used in writing data in the flash PROM 2.

The operation of the microcomputer having the above arrangement will be described.

[Execution of Instruction]

Execution of a program will be described. The PC 11 outputs, as the address signal ADR, an address at which an instruction to be executed is stored. Since the command register 24 is set in the NOP mode, the selector 26 outputs the address signal ADR to the flash memory 21. The flash memory 21 outputs the content to the internal bus 7 through the WER circuit 22 in accordance with the address. The instruction code output to the internal bus 7 is latched by the instruction register 12 and decoded by the instruction decoder 13. The execution control unit 14 designates the operation of the ALU 15 and designates a register in accordance with the decoded result from the instruction decoder 13. The calculation result from the ALU 15 is transferred via the internal bus 7 and written in the register 3. The flag of the PSW register 16 changes in accordance with the calculation result from the ALU 15. The PC 11 is incremented by one after execution of the instruction to prepare an address at which an instruction to be executed next. Instructions are executed in the above way.

[Flash PROM Write Processing Based on Interrupt Processing]

Flash PROM write processing using the flow of interrupt processing will be described next. To write 1-byte data in the flash PROM 2, a time of about 10 μs is required. On the other hand, the microcomputer operates at a high speed in accordance with an operation clock of, e.g., 20 MHz. For this reason, after the command register of the flash PROM 2 is set in a write mode, processing must wait until write processing is enabled. The wait time is controlled using the timer unit 6. When an interrupt signal is output from a peripheral circuit such as the timer unit 6 to the interrupt request generation unit 5, the interrupt request generation unit 5 determines the interrupt priority. If reception of the interrupt is enabled, the interrupt request signal IRQ is set at "1". When the interrupt request signal IRQ is set at "1", execution of the program is stopped, and interrupt processing is started. The interrupt request reception unit 17 stores the contents of the PC 11 and the PSW register 16 in the RAM 4 on the basis of a control signal from the execution control unit 14 and thereafter sets, in the PC 11, a start address necessary for the interrupt processing program. With this setting, the interrupt processing program is started. When the interrupt processing program is ended, the contents stored in the RAM 4 are returned to the PC 11 and the PSW register 16, thereby recovering the state before the interrupt processing.

FIG. 2A shows an example of a program for writing 1-byte data at address 1000H of the flash PROM 2. A0 to A6 on the left side represent addresses of the memory at which the program is stored. This program is stored in the ROM 8 and used in writing data in the flash memory.

A0: Set address 1000H in the address latch 25
A1: Set data DATA0 to be written first in the data latch 23
A2: Set the command register 24 in the write mode
A3: Set the compare register of the timer unit 6 at a value for satisfying the write time of the flash memory 21 and start the count operation of the timer A4: Set a HALT mode In the HALT mode, the CPU stops while a peripheral circuit such as the timer unit 6 operates.

FIG. 2B shows an interrupt processing program.

IA0: Set the command register 24 in the NOP mode

IA1: Stop the count operation of the timer unit 6

IA2: Return

FIG. 3 is an operation timing chart showing changes in the PC 11, the address latch 25, the data latch 23, the command register 24, and the like. When the command register 24 is set in the write (WR) mode, the selector 26 outputs, as an address, the value "1000H" set in the address latch 25 to the flash memory 21. When the HALT mode is set, the CPU 1 stops, PC 11 stops while keeping the address A4 indicated, and the access to the flash PROM 2 is ended. When the value of the timer of the timer unit 6 coincides with that of the compare register, the timer unit 6 outputs an interrupt signal to the timer unit 6 and clears the timer. The interrupt request generation unit 5 sets the interrupt request signal IRQ at "1". When the interrupt request signal IRQ is "1", the HALT mode is canceled. When the HALT mode is canceled, the PC 11 is incremented by one to indicate the address A5. The interrupt request reception unit 17 stores the contents of the PC 11 and the PSW register 16 in the RAM 4 and sets the start address IA0 of the interrupt processing program in the PC 11. When a return instruction is executed, the contents stored in the RAM 4 are returned to the PC 11 and the PSW register 16. The address A5 is set in the PC 11, so that processing from the address A5 is executed.

As described above, in the conventional arrangement, only when the command register 24 is set in the NOP mode, data set at the address of the PC 11 is output to the flash memory 21. When the command register 24 is set in the write mode, the program stored in the flash memory 21 cannot be read. For this reason, the ROM 8 dedicated to store the program is necessary. The program may be transferred to the RAM 4 and read out from the RAM 4. In this case, the capacity of the RAM 4 must be increased.

The above-described first prior art also describes a modification in which, instead of arranging the ROM 8 storing the program for writing data in the flash memory 21, the flash memory 21 is divided into a plurality of blocks which can be erased at once, and data is written in blocks other than the block storing the program using the CPU. Japanese Unexamined Patent Publication No. 6-111032 discloses the second prior art in which all of the address latch, the data latch, and the command latch are set using a serial interface.

When data is to be written in the flash PROM, both the address for reading the program to be executed and the address for writing data in the flash PROM must be designated. Therefore, a memory dedicated to store the program for writing data in the flash PROM must be arranged, resulting in an increase in chip size. When the flash PROM is divided into a plurality of blocks, and the write program is stored in another block, no dedicated memory is required, as in the modification described in Japanese Unexamined Patent Publication No. 5-266219. Instead, a selector for switching the address for executing the program and the address for writing data in the flash PROM must be arranged in each block of the flash PROM, so the problem of the increase in chip size is still kept unsolved. Alteratively, as in the second prior art, when a serial circuit is used in place of the CPU to set the address latch, the data latch, and the command register and write data in the flash PROM, neither an address selector nor a memory dedicated for write processing are required. However, a timer for starting the count operation simultaneously with setting of the command register must be arranged to wait the write time, resulting in an increase in the number of peripheral circuits. For this reason, the problem of the increase in chip size can hardly be solved.

SUMMARY OF THE INVENTION

The present invention has been made in consideration of the above situation of the prior arts, and has as its object to provide a microcomputer which enables to write data in a flash PROM without adding any dedicated memory or peripheral circuits and realizes size reduction.

In order to achieve the above object, according to the first aspect of the present invention, there is provided a microcomputer comprising a central processing unit, an interrupt request generation unit for generating an interrupt processing request, a processing request control unit for controlling two processing requests in response to the interrupt processing request on the basis of a first interrupt mode for performing interrupt processing using a program stored in a program memory and a second interrupt mode for performing interrupt processing without using the program stored in the program memory, and a flash memory serving as an electrically programmable erasable read-only memory, wherein processing of writing/deleting data in/from the flash memory is performed in the second interrupt mode.

According to the second aspect of the present invention, there is provided a microcomputer wherein the flash memory of the first aspect comprises a programmable flash-erasable memory cell, a command latch for holding a command for instructing to write/delete data in/from the flash memory, a data latch for holding data to be written in the memory cell, an address latch for holding an address corresponding to processing of writing/reading data in/from the memory cell or deleting data from the memory cell, a switching circuit for switching address signals output from the address latch and the central processing unit and outputting address data for the memory cell, and a write/delete/read circuit for writing the data in the data latch in the memory cell, reading out data from the memory cell, or deleting data from the memory cell in accordance with the address data output from the switching circuit and the command in the command latch.

According to the third aspect of the present invention, there is provided a microcomputer wherein the flash memory of the second aspect further comprises an incrementor for incrementing the address of the address latch.

According to the fourth aspect of the present invention, there is provided a microcomputer wherein the central processing unit of the first to third aspects comprises a program counter for designating an address of the program memory at which an instruction to be executed is stored, an execution control unit for executing the instruction read out from the program memory, and a program status word register for storing an operation state of the execution control unit, when the processing request based on the first interrupt mode is generated, the central processing unit stops execution of the program, saves contents of the program counter and the program status word register, and reads out the program from the program memory to execute interrupt processing based on the first interrupt mode, and when the processing request based on the second interrupt mode is generated, the central processing unit interrupts execution of the program, maintains the states of the program counter and the program status word register without saving the contents thereof, and executes interrupt processing based on the second interrupt mode without using an instruction stored in the program memory.

According to the fifth aspect of the present invention, there is provided a microcomputer further comprising a serial communication circuit connected to the interrupt request generation unit of the first to fourth aspects, and wherein a processing request based on the second interrupt mode is set in response to an interrupt received by the serial communication circuit such that data loaded by the serial communication circuit can be written in the flash memory.

As is apparent from the above aspects, according to the present invention, interrupt processing in the processing request control unit includes two processing requests for the first and second interrupt modes. Especially in the second interrupt mode, interrupt processing can be executed without using the program stored in the program memory. For this reason, no memory dedicated to execute the program for writing data in the flash memory is required. For a reception interrupt by the serial communication circuit, the second interrupt mode is set. In this case, data loaded by the serial communication circuit can be directly written in the flash PROM without being stored in a RAM or the like, so the RAM for storing the data can be omitted. Even when data is to be sent from an external circuit using the serial communication circuit, processing of writing the data in the flash memory using the CPU can be executed, and no dedicated circuit for controlling write processing in the flash memory need be independently arranged. Therefore, the size of a chip to be used can be reduced, and a compact and inexpensive microcomputer can be provided.

The above and many other objects, features and advantages of the present invention will become manifest to those skilled in the art upon making reference to the following detailed description and accompanying drawings in which preferred embodiments incorporating the principle of the present invention are shown by way of illustrated examples.

BRIEF DESCRIPTION OF THE DRAWINGS

FIGS. 2A and 2B are flow charts of the operation of a flash PROM in the prior art shown in FIG. 1, in which FIG. 2A shows the flow chart of a write program, and FIG. 2B shows the flow chart of an interrupt routine;

FIGS. 7A and 7B are flow charts of the operation of a flash PROM in the first embodiment shown in FIG. 4, in which FIG. 7A shows the flow chart of a write program, and FIG. 7B shows the flow chart of an interrupt routine;

FIG. 8 is a timing chart showing changes in various constituent elements in interrupt processing;

FIG. 13 is a timing chart showing changes in various constituent elements in interrupt processing in the second embodiment shown in FIG. 10.

DETAILED DESCRIPTION OF THE PREFERRED EMBODIMENTS

Figure 1:
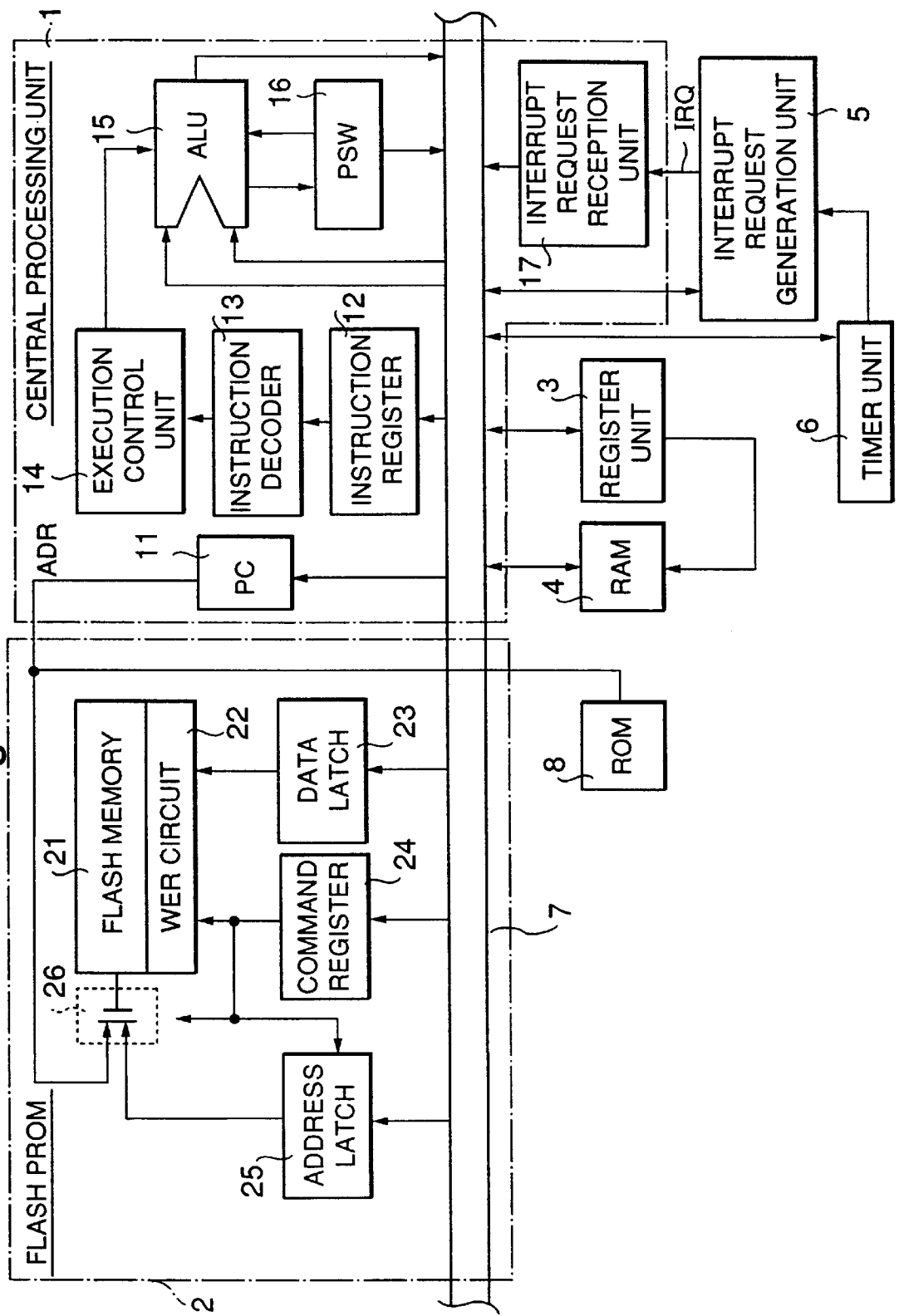
FIG. 1 is a block diagram showing an arrangement of a conventional microcomputer.
Figure 2A:
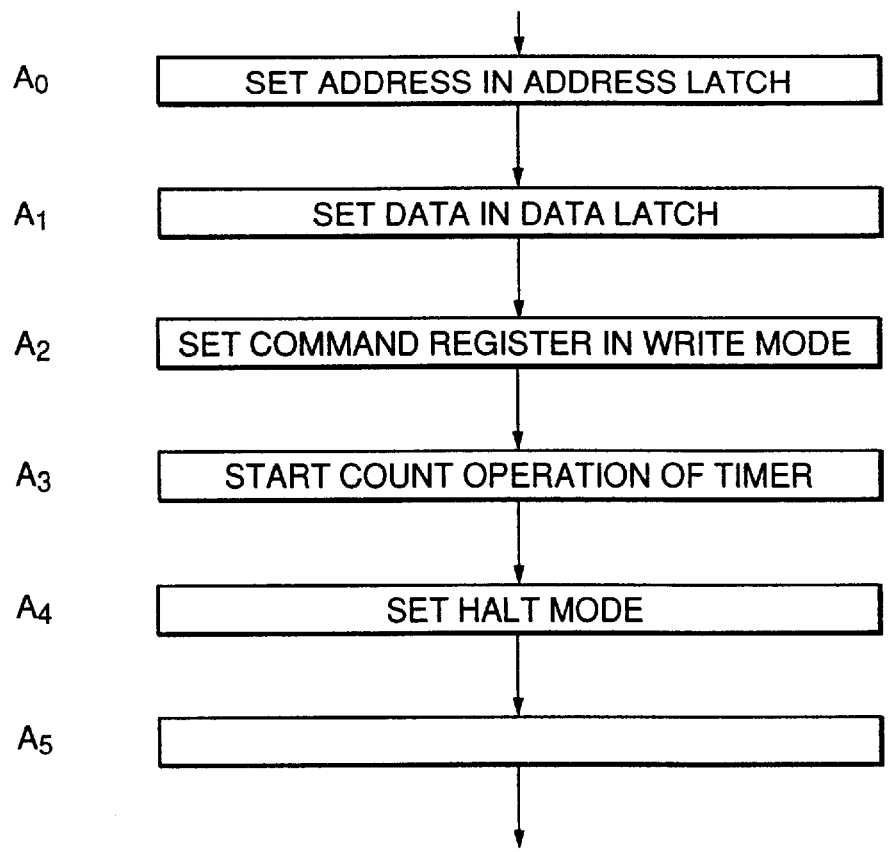
Figure 2B:
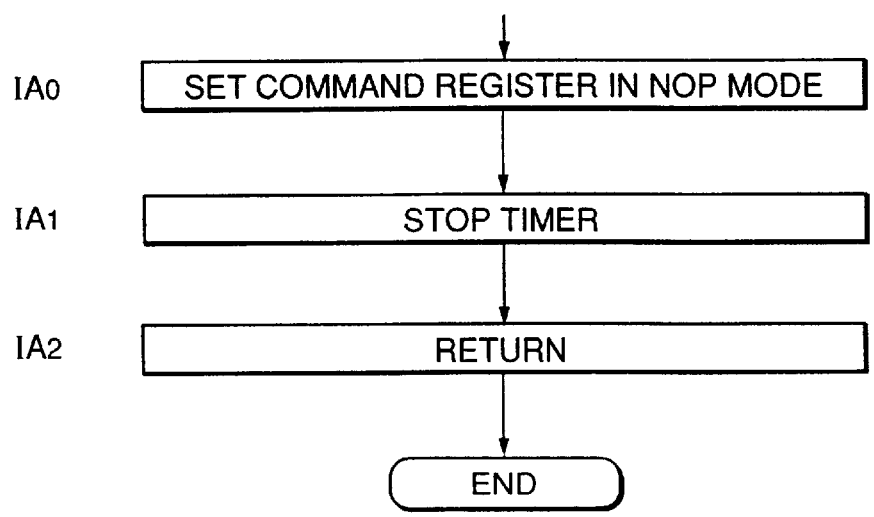
Figure 3:
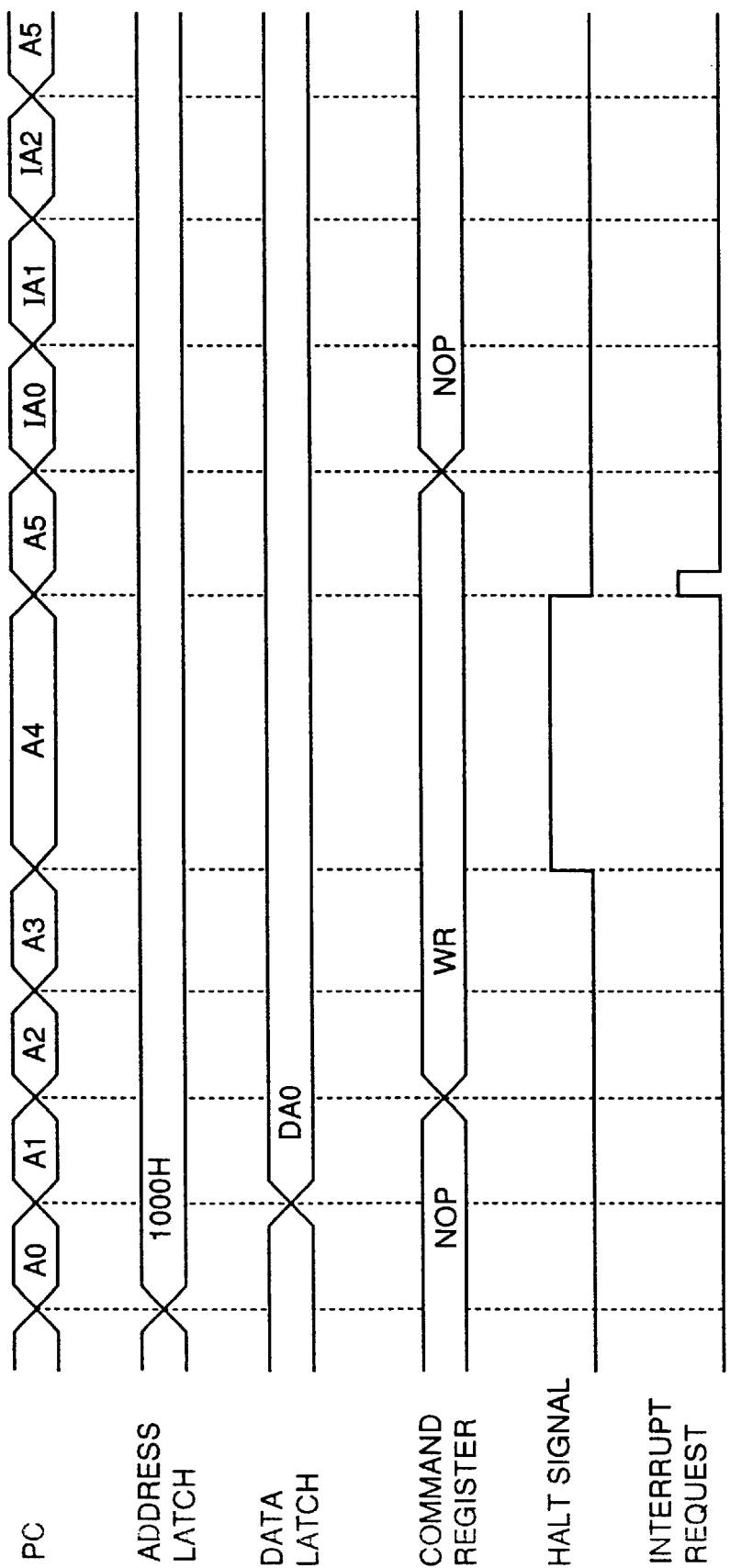
FIG. 3 is a timing chart associated with writing in the flash PROM in the prior art shown in FIG. 1.
Figure 4:
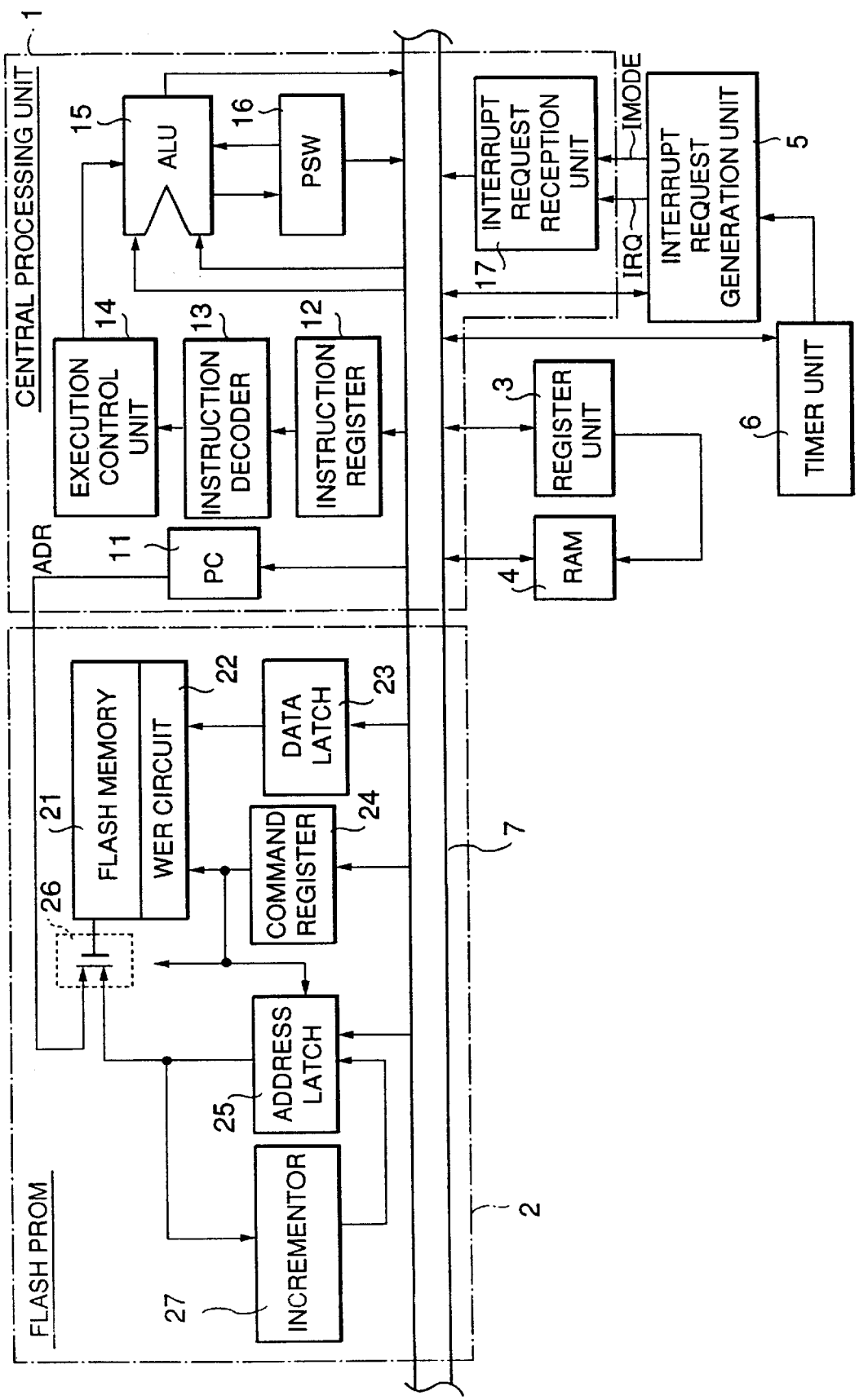
FIG. 4 is a block diagram showing the arrangement of the first embodiment of the present invention.

Preferred embodiments of the present invention will be described below with reference to the accompanying drawings. FIG. 4 is a block diagram of the first embodiment of the present invention. The microcomputer of this embodiment comprises a CPU (Central Processing Unit) 1, a flash PROM 2, a register unit 3, a RAM 4, an interrupt request generation unit 5, a timer unit 6, and an internal bus 7 for connecting these units. The ROM 8 shown in FIG. 1 is omitted. The CPU 1 comprises a PC (program counter) 11 for writing data transferred via the internal bus 7 and outputting an address signal ADR to the flash PROM 2, an instruction register 12 for latching an instruction code transferred via the internal bus 7, an instruction decoder 13 for decoding the instruction code from the output from the instruction register 12, an execution control unit 14 for executing the instruction in accordance with the decoded result from the instruction decoder 13, an ALU (calculator) 15 for loading, e.g., two data transferred via the internal bus 7, performing calculation in accordance with the execution control unit 14, outputting the calculation result to the internal bus 7, and outputting the flag change according to the calculation result to a PSW (program status word) register 16, the PSW register 16 serving as a register for holding the flag according to the calculation result from the ALU 15, and an interrupt request reception unit 17 serving as a processing request control unit for controlling interrupt processing in accordance with an interrupt request signal IRQ output from the interrupt request generation unit 5 and an interrupt mode signal IMODE representing an interrupt mode.

The flash PROM 2 comprises a flash memory 21, a WER circuit (write/erase/read control circuit) 22, a data latch 23 for latching, from the internal bus 7, data to be written in the flash memory 21, a command register 24 for latching, from the internal bus 7, a command to be supplied to the WER circuit 22, an address latch 25 for latching, from the internal bus 7, an address to be used in the write mode in the flash memory 21, a selector 26 for switching the address signal ADR and the output signal from the address latch 25 and outputting the selected signal to the flash memory 21 as an address, and an incrementor 27 for incrementing the value of the address latch by one. When the command register 24 is in an NOP mode representing processing other than write/erase processing, i.e., normal read processing, the selector 26 outputs the address signal ADR to the flash memory 21 as an address. When the command register 24 is not in the NOP mode, the selector 26 outputs the output signal from the address latch 25 to the flash memory 21 as an address.

The register unit 3 is used to store values for the program or the like and also used to designate an address of the RAM 4. The RAM 4 receives an address from the internal bus 7 and receives/outputs data from/to the internal bus 7. The timer unit 6 is constituted by a timer for performing a count operation in synchronism with an internal clock, and a compare register. When the value of the timer coincides with that of the compare register, the timer unit 6 outputs an interrupt signal to the interrupt request generation unit 5 and clears the timer. The interrupt request generation unit 5 receives an interrupt request from a peripheral circuit such as the timer unit 6 and outputs the interrupt mode signal IMODE and the interrupt request signal IRQ to the interrupt request reception unit 17 of the CPU 1.

The operation of the microcomputer having the above arrangement will be described.

[Execution of Instruction]

Execution of a program will be described. The PC 11 outputs, as the address signal ADR, an address at which an instruction to be executed is stored. Since the command register 24 is set in the NOP mode, the selector 26 outputs the address signal ADR to the flash memory 21. The flash memory 21 outputs the contents of the ROM to the internal bus 7 through the WER circuit 22 in accordance with the address signal ADR. The instruction code transferred via the internal bus 7 is latched by the instruction register 12 and decoded by the instruction decoder 13. The execution control unit 14 designates the operation of the ALU 15 and designates a register of the register unit 3 in accordance with the decoded result from the instruction decoder 13. The calculation result from the ALU 15 is transferred via the internal bus 7 and written in the register unit 3. The flag of the PSW register 16 changes in accordance with the calculation result from the ALU 15. The PC 11 is incremented by one after execution of the instruction to prepare an address at which an instruction to be executed next is stored. Instructions are executed in the above way.

[Interrupt Processing]

The flow of interrupt processing will be described. In FIG. 4, only the timer unit 6 is shown. Normally, a plurality of peripheral circuits are connected in addition to the timer unit 6. When an interrupt signal is output from the peripheral circuit such as the timer unit 6 to the interrupt request generation unit 5, the interrupt request generation unit 5 determines the interrupt priority. If reception of the interrupt is enabled, the interrupt request signal IRQ is set at "1". In addition, according to setting of the interrupt mode, when interrupt mode 1 is set, the interrupt mode signal IMODE is set at "0". When interrupt mode 2 is set, the interrupt mode signal IMODE is set at "1". Interrupt mode 1 is normal interrupt processing described in the prior art, and a detailed description thereof will be omitted.

Figure 5:
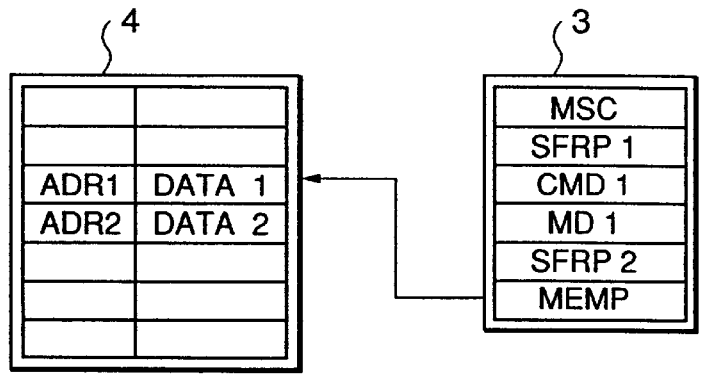
FIG. 5 is a view showing the arrangement of a register unit of the present invention in association with a RAM.

An operation of writing data stored in the RAM 4 in the flash PROM using interrupt mode 2 will be described. FIG. 5 is a view showing the arrangement of the register unit 3 used in interrupt mode 2. FIG. 5 explains a portion corresponding to interrupt of the timer unit 6. For other interrupt processing, corresponding registers are prepared. In this example, the register unit 3 is used. However, a specific address of the RAM 4 may be used in place of a register. A timer control register and the like are called special function registers (to be referred as SFRs hereinafter). Each register of the SFRs will be described.

A register MSC designates the number of times of processing in interrupt mode 2. When MSC=0, interrupt mode 2 is ended, and processing in interrupt mode 1 is started. Registers SFRP1 and SFRP2 designate addresses of the SFR. Registers CMD1 and CMD2 represent data to be set at the address indicated by the register SFRP1. A register MEMP designates an address at which data to be transferred to the address indicated by the register SFRP2 is stored. In this example, the register MEMP indicates an address of the RAM 4 at which data is stored.

Figure 6:
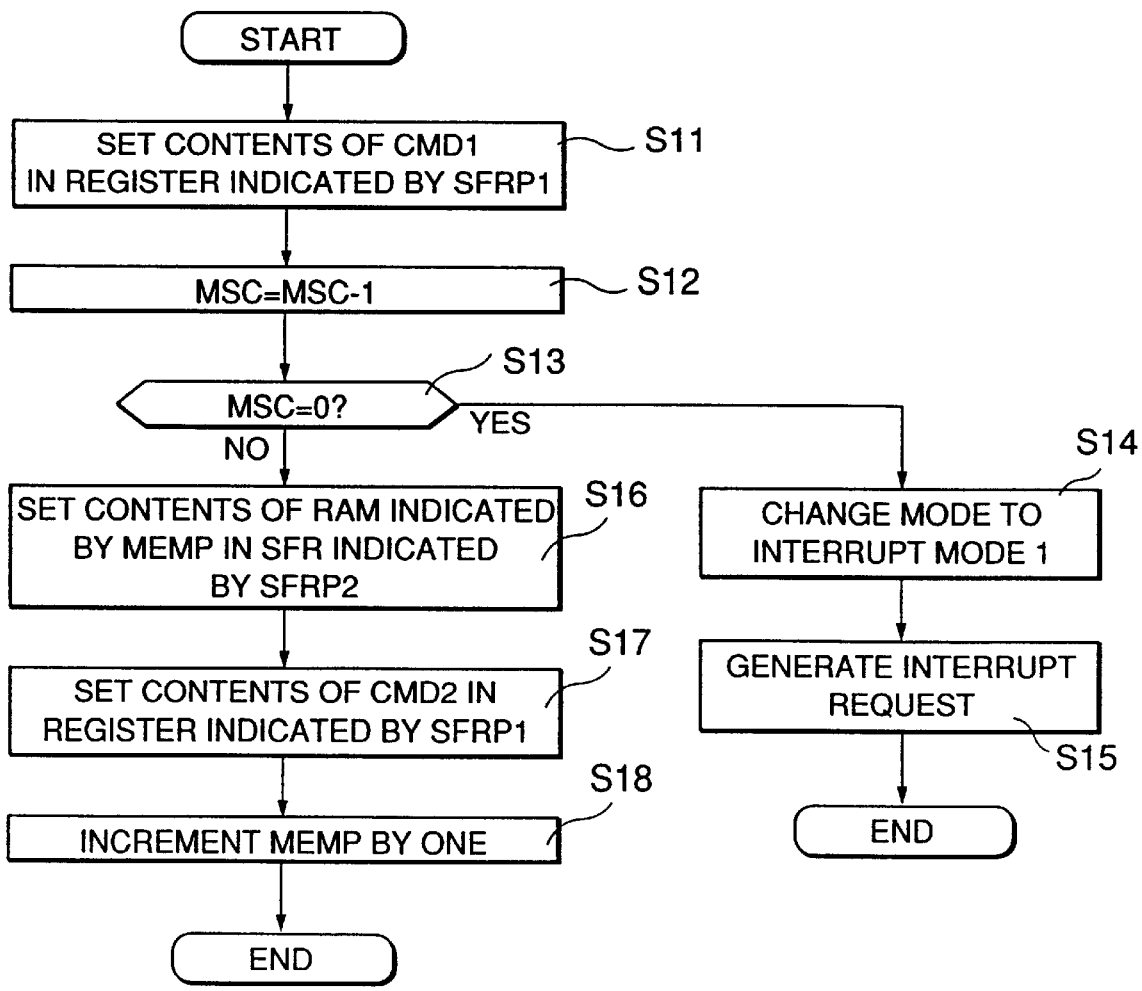
FIG. 6 is a flow chart showing the flow of processing of a second interrupt mode in the first embodiment.

When interrupt mode 2 is set, the following processing is performed. FIG. 6 is a flow chart of interrupt mode 2. The flow of interrupt mode 2 will be described. First, the contents of the register CMD1 are transferred to a register indicated by the register SFRP1 (S11). The contents of the register MSC are decremented by one (S12). If MSC=0, the interrupt mode is changed to interrupt mode 1, and an interrupt request is generated, thereby ending the processing (S13 to S15). Thereafter, interrupt processing based on interrupt mode 1 is executed. If MSC≠0, the contents of the RAM at an address indicated by the register MEMP are transferred to the SFR at an address represented by the register SFRP2 (S16). The contents of the register CMD2 are transferred to a register indicated by the register SFRP1 (S17). Thereafter, the value of the register MEMP is incremented by one (Sl8).

[Example of Flash PROM Write Program Based on Interrupt Mode 2]

Figure 7A:
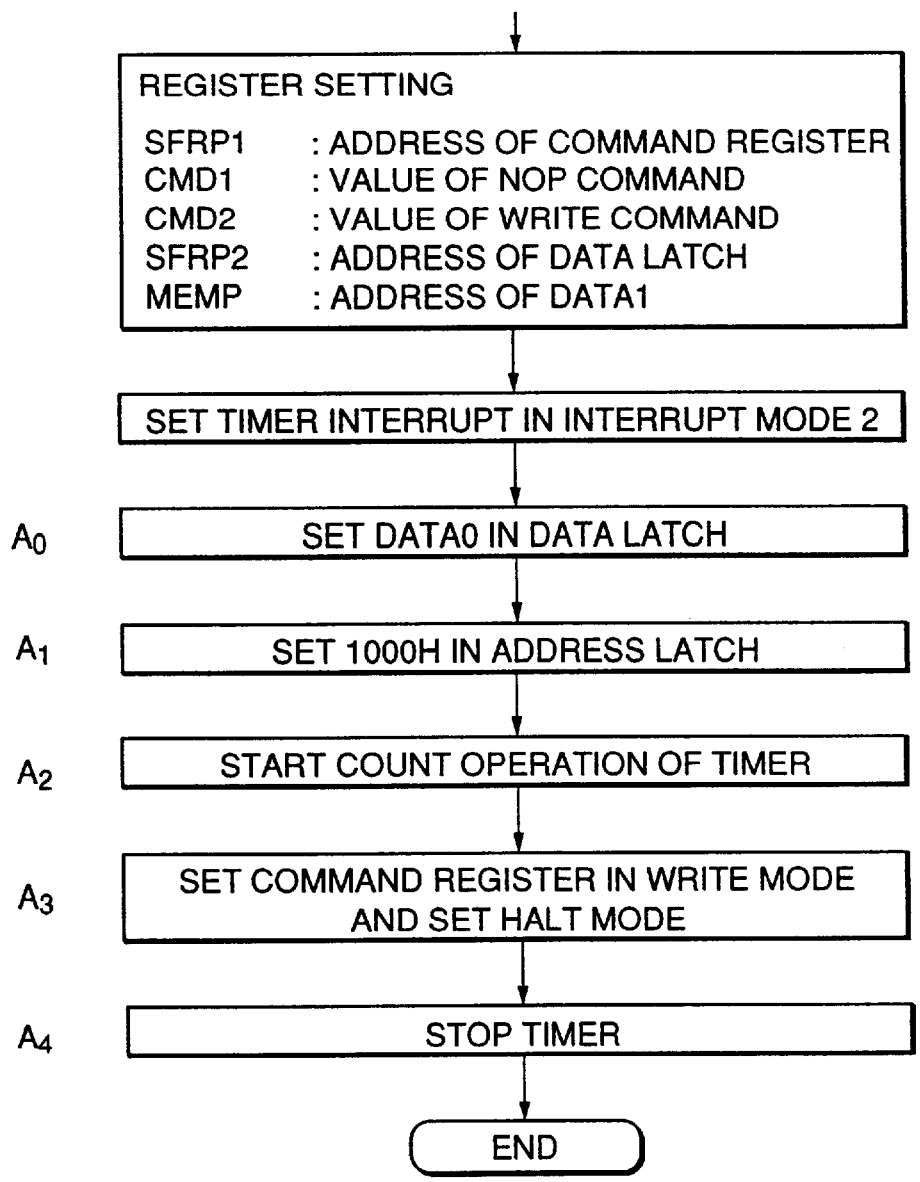

FIG. 7A shows an example of a program for writing 10-byte data from address 1000H in interrupt mode 2. First, registers are set for processing based on interrupt mode 2. A value of "10" is set in the register MSC, an address of the command register 24 is set in the register SFRP1, data representing an NOP command is set in the register CMD1, data representing a write command is set in the register CMD2, an address of the data latch 23 is set in the register SFRP2, and an address at which data DATA1 to be written at the second byte is stored is set in the register MEMP. In addition, the interrupt request generation unit 5 is set such that interrupt processing of the timer unit 6 is performed in interrupt mode 2.

Addresses A0 to A4 are set as follows.

A0: Set data DATA0 to be written first in the data latch 23

A1: Set address 1000H in the address latch 25

Figure 7B:
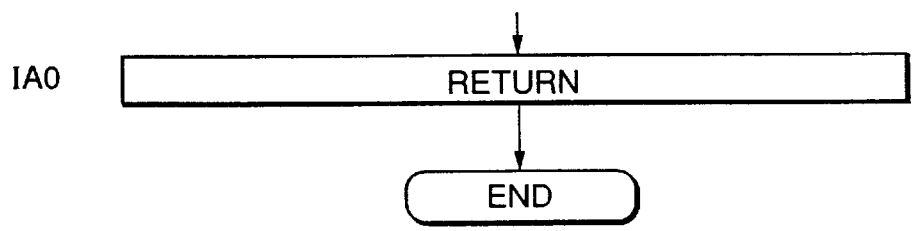

A2: Set the compare register of the timer unit 6 to a value for satisfying the write time of the flash memory 21 and start the count operation of the timer A3: Set the command register 24 in a write mode, and set a HALT mode FIG. 7B shows an interrupt processing program used in interrupt mode 1. This program returns to the main routine at an address IA0.

FIG. 8 is a timing chart showing changes in the PC 11, the address latch 25, the data latch 23, the command register 24, the register MSC, the register MEMP, and the like. In the HALT mode, the CPU 1 stops while a peripheral circuit such as timer unit 6 operates. When the command register 24 is set in the write (WR) mode, the selector 26 outputs, as an address, the value set in the address latch 25 to the flash memory 21. When the HALT mode is set, the CPU 1 stops, the PC 11 stops while keeping address A3 indicated, and the access to the flash PROM 2 is ended.

When the value of the timer of the timer unit 6 coincides with that of the compare register, the timer unit 6 outputs an interrupt signal to the interrupt request generation unit 5 and clears the timer. Since the timer unit 6 is set in interrupt mode 2, the interrupt request generation unit 5 sets the interrupt request signal IRQ at "1" and the interrupt mode signal IMODE at "1". Since the interrupt mode signal IMODE is "1", the flow shown in FIG. 6 is executed. Since the register SFRP1 indicates the command register 24, and the register CMD1 indicates an NOP command, the command register 24 is set in the NOP mode. When the command register 24 is set in the NOP mode, the address latch 25 latches a value which is incremented by one by the incrementor 27. Next, the value of the register MSC is decremented by one to "9". Since the register CMD2 indicates a write command, the command register 24 is set in the write mode. The value of the register MEMP is incremented by one to 1001H.

The above processing is performed by the interrupt request reception unit 17. The interrupt request reception unit 17 operates independently of the value of the instruction register and does not read data at the address indicated by the PC 11. When the interrupt request signal IRQ is "1", and the interrupt mode signal IMODE is "1", the HALT mode is canceled during the interrupt processing. After interrupt processing is ended, the HALT mode is set again. Thereafter, every time the value of the timer coincides with that of the compare register, write processing in the flash memory is repeated.

Figure 9:
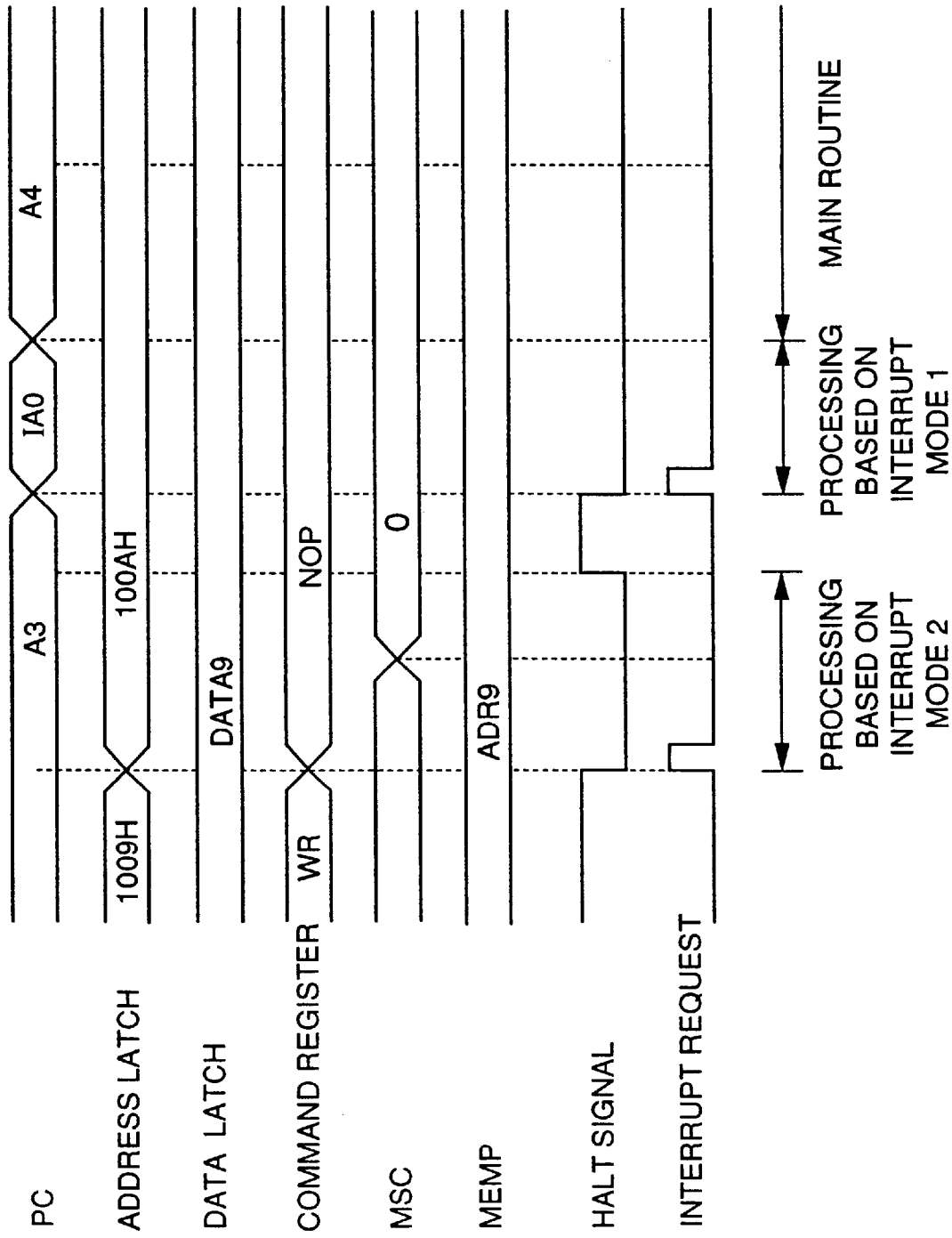
FIG. 9 is a timing chart showing changes in various constituent elements in interrupt processing performed when the value of a timer coincides with that of a compare register for the 10th time.

FIG. 9 is a timing chart of interrupt processing performed when the value of the timer coincides with that of the compare register for the 10th time. When the command register 24 is set in the NOP mode, the value of the register MSC is decremented by one to "0". Since MSC=0, the interrupt mode is changed to interrupt mode 1. When the interrupt request signal IRQ is set at "1" again, the HALT mode is canceled because the interrupt mode signal IMODE is "0", and the interrupt request signal IRQ is "1". When interrupt processing is performed on the basis of interrupt mode 1, the address IA0 of the interrupt processing routine shown in FIG. 7B is set in the PC 11. In this example, no processing is performed in the interrupt processing routine, and the interrupt processing routine returns to the main routine. For this reason, the timer is stopped at the address A4 of the main routine, thereby ending writing of 10-byte data.

Figure 10:
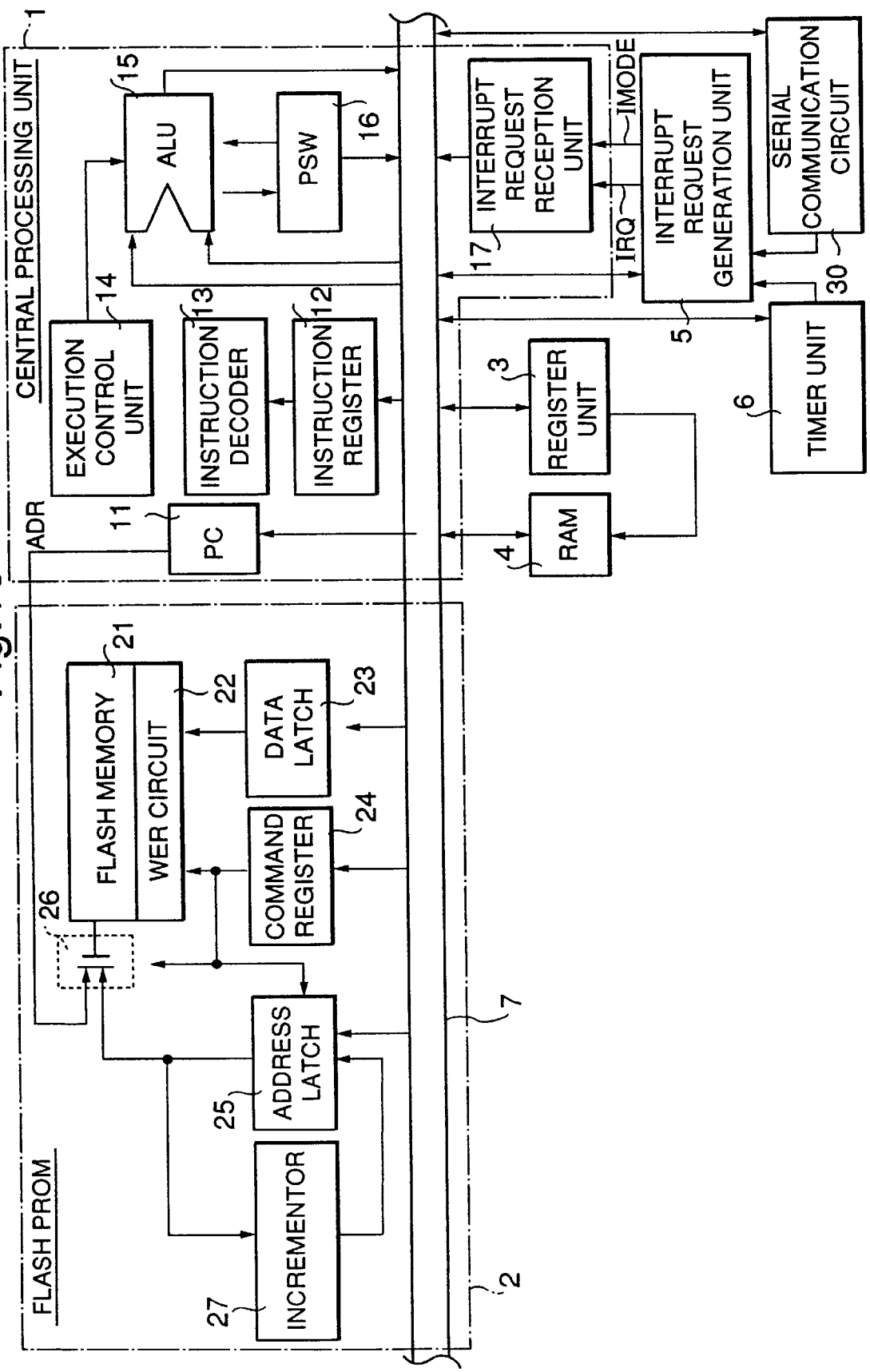
FIG. 10 is a block diagram showing the arrangement of the second embodiment of the present invention.
Figure 11A:
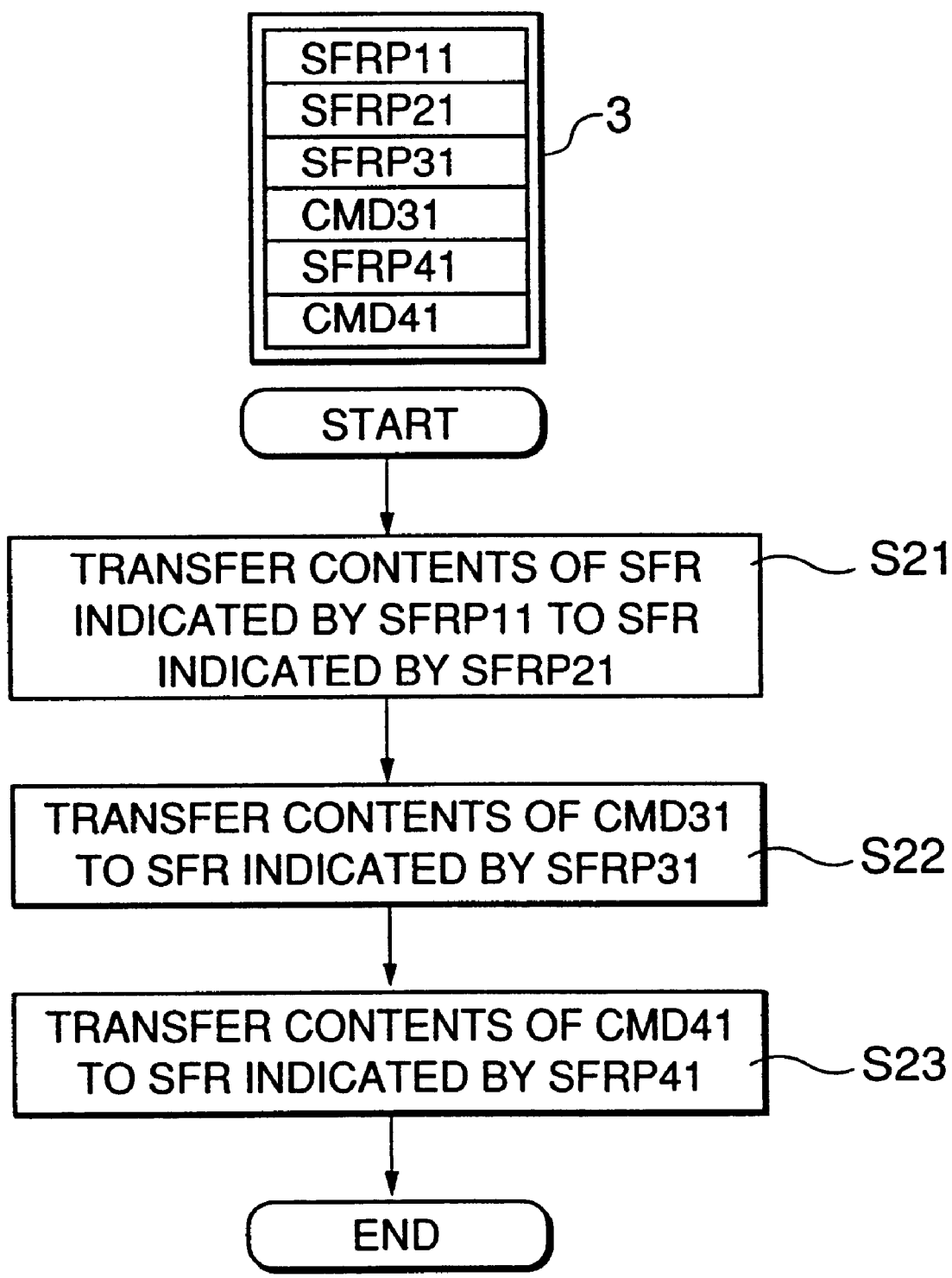
FIGS. 11A and 11B are views showing register arrangements used in the second embodiment shown in FIG. 10 and the flow charts of processing based on a second interrupt mode.
Figure 11B:
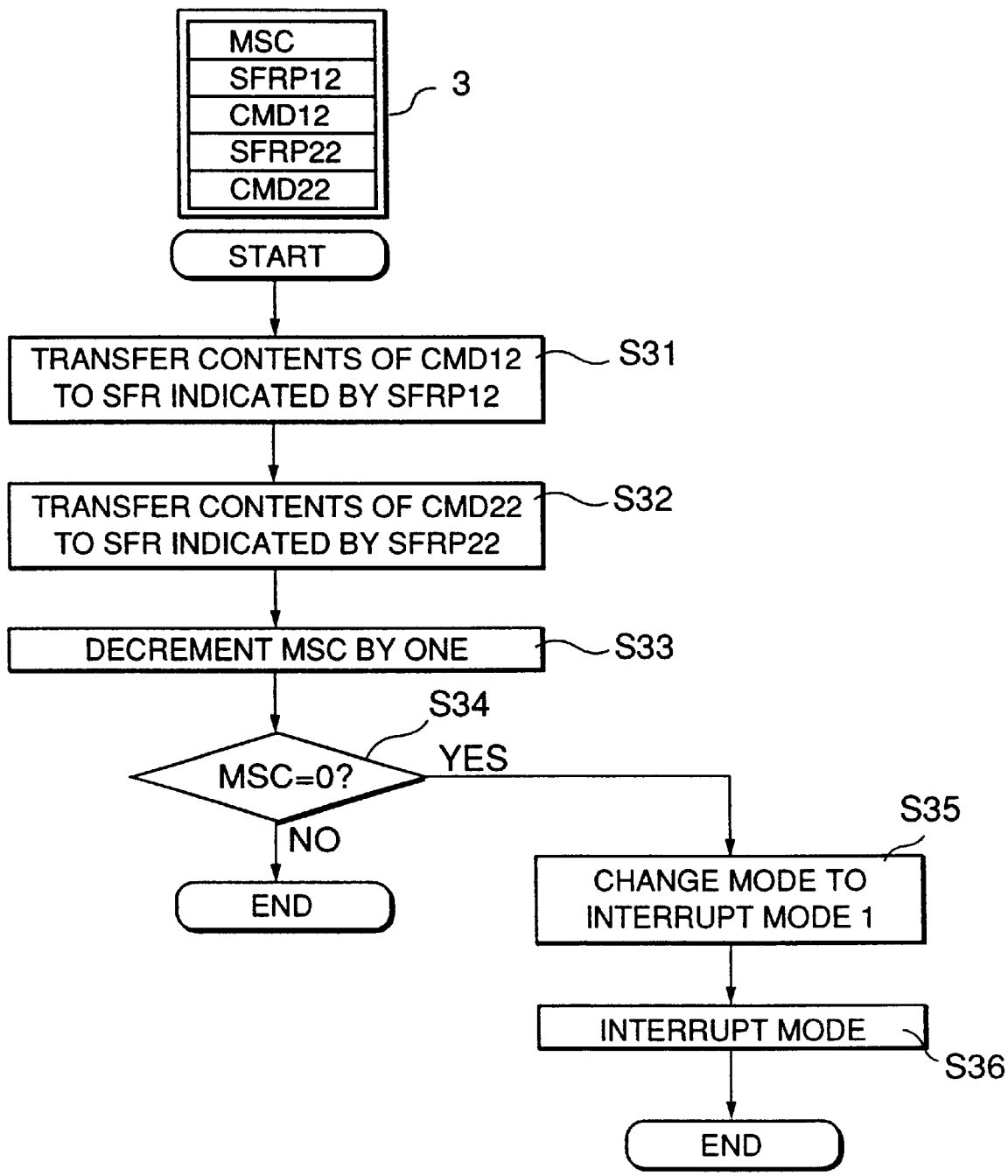

The second embodiment of the present invention will be described below with reference to FIG. 10. The microcomputer has the same arrangement as that shown in FIG. 4. In the second embodiment, however, not only a timer unit 6 shown in FIG. 4 but also a serial communication circuit 30 is incorporated as a peripheral circuit. With this arrangement, data received by the serial communication circuit 30 can be directly written in a flash PROM 2. FIGS. 11A and 11B show flows and registers used in interrupt mode 2. FIG. 11A shows a flow and registers used in the reception interrupt of the serial communication circuit. FIG. 11B shows a flow and registers used in a timer coincidence interrupt. Referring to FIGS. 11A and 11B, a register MSC designates the number of times of processing in interrupt mode 2. Registers SFRP11, SFRP21, SFRP31, SFRP41, SFRP12, and SFRP22 designate addresses of the SFRs. Registers CMD31, CMD41, CMD12, and CMD22 indicate data to be set in the SFRs.

The flow of interrupt mode 2 based on serial reception interrupt shown in FIG. 11A will be described. First, the contents of an SFR indicated by the register SFRP11 are transferred to an SFR indicated by the register SFRP21 (S21). Next, the contents of the register CMD31 are set in an SFR indicated by the register SFRP31 (S22). The contents of the register CMD41 are set in an SFR indicated by the register SFRP41 (S23).

The flow of interrupt mode 2 based on the timer coincidence interrupt shown in FIG. 11B will be described. First, the contents of the register CMD12 are set in an SFR indicated by the register SFRP12 (S31). Next, the contents of the register CMD22 are set in an SFR indicated by the register SFRP22 (S32). The contents of the register MSC are decremented by one (S3). If MSC≠0, the processing is ended (S34). If MSC=0, the interrupt mode is changed to interrupt mode 1 (S35), and an interrupt request is generated (S36). Thereafter, interrupt processing based on interrupt mode 1 is executed.

[Flash PROM Write Program Based on Interrupt Mode 2]

Figure 12:
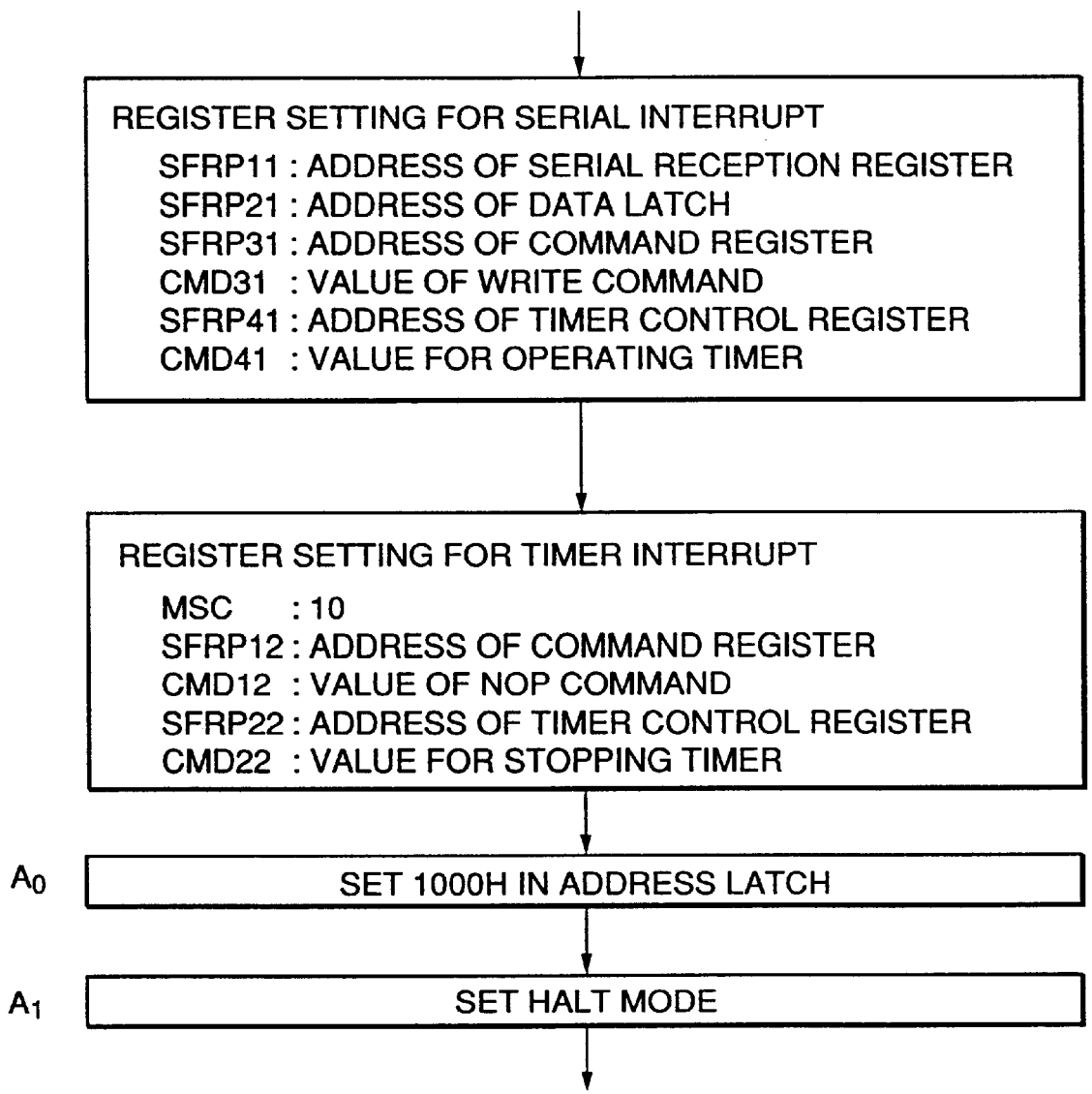
FIG. 12 is a flow chart of a program for writing data in a flash PROM in the second embodiment shown in FIG. 10.

FIG. 12 shows an example of a program for writing 10-byte data received by the serial communication circuit from address 1000H in interrupt mode 2. First, registers are set for processing in interrupt mode 2 based on serial reception interrupt. An address of the serial reception register is set in the register SFRP11, an address of the data latch 23 is set in the register SFRP21, an address of a command register 24 is set in the register SFRP31, data representing a write command is set in the register CMD31, an address of the control register of the timer unit 6 is set in the register SFRP41, and data for stopping the operation of the timer unit 6 is set in the register CMD41. Next, registers are set for processing in interrupt mode 2 based on a timer interrupt. A value of "10" is set in the register MSC, an address of the command register 24 is set in the register SFRP12, data representing an NOP command is set in the register CMD12, an address of the control register of the timer unit 6 is set in the register SFRP22, and data for stopping the operation of the timer unit 6 is set in the register CMD22. In addition, an interrupt request generation unit 5 is set such that a serial reception interrupt and interrupt processing of the timer unit 6 are performed in interrupt mode 2.

A0: Set address 1000H in an address latch 25
A1: Set a HALT mode

FIG. 13 is an operation timing chart showing changes in a PC 11, the address latch 25, a data latch 23, the command register 24, the register MSC, and the like. Upon receiving data, the serial communication circuit 30 outputs a reception completion interrupt signal to the interrupt request generation unit 5. Since serial reception interrupt mode 2 is set, the interrupt request generation unit 5 sets an interrupt request signal IRQ at "1" and an interrupt mode signal IMODE at "1". Since the interrupt mode signal IMODE is "1", the flow shown in FIG. 11A is executed. Since the register SFRP11 indicates an address of the serial reception register, and the register SFRP21 indicates an address of the data latch 23, the contents of the serial reception register are set in the data latch. Since the register CMD31 indicates write command data, and the register SFRP31 indicates an address of the command register 24, the command register 24 is set in the write mode. Since the command register 24 is set in the write mode, a selector 26 outputs the contents of the address latch 25 to a flash memory 21. Since the register CMD41 has a value for starting the count operation of the timer unit 6, and the register SFRP41 indicates an address of the control register of the timer unit 6, the timer unit 6 starts the count operation. When the interrupt request signal IRQ is "1", and the interrupt mode signal IMODE is "1", the HALT mode is canceled during the interrupt processing. When the interrupt processing is complete, the HALT mode is set again.

When the value of the timer of the timer unit 6 coincides with that of the compare register, the timer unit 6 outputs an interrupt signal to the interrupt request generation unit 5. Since the timer interrupt is set in interrupt mode 2, the interrupt request generation unit 5 sets the interrupt request signal IRQ at "1" and the interrupt mode signal IMODE at "1". Since the interrupt mode signal IMODE is "1", the flow shown in FIG. 11B is executed. The register CMD12 represents NOP command data, and the register SFRP12 indicates an address of the command register 24, the command register 24 is set in the NOP mode. When the command register 24 is set in the NOP mode, the address latch 25 latches a value which is incremented by one by an incrementor 27. Since the register CMD22 has data for stopping the operation of the timer unit 6, and the register SFRP22 indicates an address of the control register of the timer unit 6, the timer unit 6 stops the count operation. The value of the register MSC is decremented by one to "9". Since MSC≠0, processing in interrupt mode 2 is ended. When the interrupt request signal IRQ is "1", and the interrupt mode signal IMODE is "1", the HALT mode is canceled during the interrupt processing. After the interrupt processing is ended, the HALT mode is set again. Processing of writing data received by the serial communication circuit 30 in the flash PROM 2 is repeated until the value of the register MSC becomes "0". For the timer interrupt of this example, the register MSC is arranged to set the number of data to be written in the flash memory. However, the register MSC may be omitted, and the microcomputer may be reset after a necessary number of bytes are transferred, and the program written in the flash PROM 2 may be executed.

The third embodiment of the present invention will be described next. In this embodiment, the incrementor 27 is omitted from the block diagram shown in FIG. 4 in the first embodiment, and a register SFRP3 for indicating an address of an address latch 25 is prepared as a register for processing interrupt mode 2 based on a timer interrupt such that increment processing can be performed by an ALU 15 in a CPU 1. The hardware size can be reduced by using the ALU 15 in the CPU 1. The flow of this processing will be described below. The contents of a register CMD1 are transferred to a register indicated by a register SFRP1. The contents of a register MSC are decremented by one. If MSC=0, the interrupt mode is changed to interrupt mode 1, and an interrupt request is generated, thereby ending the processing. Thereafter, interrupt processing based on interrupt mode 1 is executed. The contents of the SFR at an address indicated by a register SFRP3 are read out, the readout value is incremented by one by the ALU 15 and rewritten in the SFR indicated by the register SFRP3. If MSC≠0, the contents at an address indicated by a register MEMP are transferred to the SFR at an address indicated by a register SFRP2. The value of the register MEMP is incremented by one. A HALT mode is set, and the processing is ended.

When such interrupt mode 2 is prepared, data can be written in the flash PROM, as in the block diagram shown in FIG. 4. Write processing has been described above. Verify processing of verifying written data or deletion can also be performed in interrupt mode 2.

Japanese Examined Patent Publication No. 4-14736 discloses a method of performing data transfer and the like while arranging two interrupt modes. The present invention is different from this prior-art technique in that not only simple data transfer but also data setting and command setting are performed.

What is claimed is:

1. A microcomputer comprising:

a central processing unit;

an interrupt request generation circuit for generating an interrupt processing request;

a processing request control unit for controlling two processing requests in response to the interrupt processing request on a basis of a first interrupt mode for performing interrupt processing using a program stored in a program memory and a second interrupt mode for performing interrupt processing without using the program stored in said program memory; and a flash memory serving as an electrically programmable erasable read-only memory, wherein processing of writing/deleting data in/from said flash memory is performed in the second interrupt mode, wherein said central processing unit comprises a program counter for designating an address of said program memory at which an instruction to be executed is stored, an execution control unit for executing the instruction read out from said program memory, and a program status word register for storing an operation state of said execution control unit, when the processing request based on the first interrupt mode is generated, said central processing unit stops execution of the program, saves contents of said program counter and said program status word register, and reads out the program from said program memory to execute interrupt processing based on the first interrupt mode, and when the processing request based on the second interrupt mode is generated, the central processing unit interrupts execution of the program, maintains the states of said program counter and said program status word register without saving the contents thereof, and executes interrupt processing based on the second interrupt mode without using an instruction stored in said program memory.

2. A microcomputer comprising:

a central processing unit:

an interrupt request generation circuit for generating an interrupt processing request;

a processing request control unit for controlling two processing requests in response to the interrupt processing request on a basis of a first interrupt mode for performing interrupt processing using a program stored in a program memory and a second interrupt mode for performing interrupt processing without using the program stored in said program memory;

a flash memory serving as an electrically programmable erasable read-only memory, wherein processing of writing/deleting data in/from said flash memory is performed in the second interrupt mode, said microcomputer further comprising:

a serial communication circuit connected to said interrupt request generation unit, and wherein a processing request based on the second interrupt mode is set in response to an interrupt received by said serial communication circuit such that data loaded by said serial communication circuit can be written in said flash memory.

3. A microcomputer comprising:

a central processing unit;

an interrupt request generation unit for generating an interrupt processing request;

a processing request control unit for controlling two processing requests in response to the interrupt processing request on a basis of a first interrupt mode for performing interrupt processing using a program stored in a program memory and a second interrupt mode for performing interrupt processing without using the program stored in said program memory;

a flash memory serving as an electrically programmable erasable read-only memory;

wherein processing of writing/deleting data in/from said flash memory is performed in the second interrupt mode, said data originating from one of a RAM memory during the second interrupt mode and a serial communications circuit, said data from the serial communications circuit being written into said flash memory without ever being stored in said RAM memory.

* * * * *